(12) United States Patent
Bose (10) Patent No.: US 6,398,851 B1
(45) Date of Patent: Jun. 4, 2002

(54) ANTI-AIR POLLUTION & ENERGY CONSERVATION SYSTEM FOR AUTOMOBILES USING LEADED OR UNLEADED GASOLINE, DIESEL OR ALTERNATE FUEL

(76) Inventor: Ranendra K. Bose, 14346 Jacob La., Centreville, VA (US) 20120-3305

( * ) Notice: Subject to any disclaimer, the term of this patent is extended or adjusted under 35 U.S.C. 154(b) by 0 days.

(21) Appl. No.: 09/656,732

(22) Filed: Sep. 7, 2000

(51) Int. Cl.⁷ .............................................. B01D 50/00
(52) U.S. Cl. .............................. 95/273; 95/232; 95/237; 95/287; 96/351; 96/366; 55/385.3; 55/409; 55/459.1; 55/482; 55/485; 55/DIG. 30; 55/317; 60/279; 60/902
(58) Field of Search ........................... 55/317, 385.3, 55/404, 405, 409, 459.1, 482, 485, DIG. 30; 96/256, 263, 329, 351, 361, 364, 365, 366; 95/226, 232, 237, 273, 287; 60/273, 278, 279, 282, 297, 310, 311, 902; 422/168, 187

(56) References Cited

U.S. PATENT DOCUMENTS

| | | | |
|---|---|---|---|
| 2,789,032 A | | 4/1957 | Bagley, et al. .................... 23/2 |
| 2,954,841 A | * | 10/1960 | Reistle, Jr. ..................... 55/104 |
| 3,712,029 A | * | 1/1973 | Charlton ................ 55/DIG. 30 |
| 3,793,807 A | | 2/1974 | Prem Das ....................... 55/93 |
| 3,815,337 A | * | 6/1974 | Lenane ................. 55/DIG. 30 |
| 3,861,142 A | * | 1/1975 | Bose ........................... 60/279 |
| 3,892,070 A | | 7/1975 | Bose ........................... 60/279 |
| 3,918,937 A | | 11/1975 | Holloway et al. ............. 55/97 |
| 4,235,845 A | * | 11/1980 | Bose .......................... 422/171 |
| 4,399,107 A | | 8/1983 | Bose .......................... 422/170 |
| 4,622,051 A | * | 11/1986 | Polach et al. .......... 55/DIG. 30 |
| 4,649,703 A | * | 3/1987 | Dettling et al. ............... 60/279 |
| 4,989,408 A | * | 2/1991 | Leonhard et al. ...... 55/DIG. 30 |
| 5,053,063 A | * | 10/1991 | Sisk ............................. 55/304 |
| 6,176,889 B1 | * | 1/2001 | Koskinen ..................... 55/406 |
| 6,200,361 B1 | * | 3/2001 | Krymsky ..................... 55/409 |

FOREIGN PATENT DOCUMENTS

CA  1104060  6/1981  ............. F01N/3/02

* cited by examiner

Primary Examiner—Duane Smith
Assistant Examiner—Jason M. Greene (57) ABSTRACT

Exhaust gases from an internal combustion engine operating with leaded or unleaded gasoline or diesel or natural gas, are used for energizing a high-speed gas turbine. The convoluting gas discharge causes a first separation stage by stratifying of heavier and lighter exhaust gas components that exit from the turbine in opposite directions, the heavier components having a second stratifying separation in a vortex tube to separate combustible pollutants from non-combustible components. The non-combustible components exit a vortex tube open end to atmosphere. The lighter combustible, pollutants effected in the first separation are bubbled through a sodium hydroxide solution for dissolving the nitric oxide, formaldehyde impurities in this gas stream before being piped to the engine air intake for re-combustion, thereby reducing the engine's exhaust pollution and improving its fuel economy. The combustible, heavier pollutants from the second separation stage are piped to air filter assemblies. This gas stream convoluting at a high-speed through the top stator-vanes of the air filters, centrifugally separates the coalescent water, aldehydes, nitrogen dioxides, sulfates, sulfur, lead particles which collect at the bottom of the bowl, wherein it is periodically released to the roadway. Whereas, the heavier hydrocarbon, carbon particles are piped through the air filter's porous element to the engine air intake for re-combustion, further reducing the engine's exhaust pollution and improving its fuel economy.

20 Claims, 2 Drawing Sheets

ANTI-AIR POLLUTION & ENERGY CONSERVATION SYSTEM FOR AUTOMOBILES USING LEADED OR UNLEADED GASOLINE, DIESEL OR ALTERNATE FUEL

CROSS-REFERENCES TO RELATED APPLICATIONS

This Invention is an improvement over the system shown in my prior U.S. Pat. Nos 4,399,107 dated Aug. 16, 1983; U.S. Pat. No. 4,235,845 issued Nov. 25, 1980; U.S. Pat. No. 3,892,070 issued Jul. 1, 1975; U.S. Pat. No. 3,861,142 issued Jan. 21, 1975 and Canadian Patent No: 1,104,060 issued Jun. 30, 1981. All USA and Canadian patents are incorporated by reference herein, the present disclosures being based primarily on these which are repeated herein.

FEDERALLY SPONSORED RELIABILITY AND LIFECYCLE TESTS

My patented, "Anti-Pollution System For Automobiles", Experimental Prototype based on U.S. Pat. Nos. 4,235,845; 3,892,070 and 3,861,142 received an US D.O.E Grant Award from its Office of Energy Related Inventions. The Grant was used to demonstrate the Bose System's pollutant gas separation and emission control efficiencies along with the fuel economy achieved, as compared with the OEM Catalytic Converter, as a retrofit application on a new 1979 Model Chrysler Cordoba V8, 5.9 Liter engine capacity test automobile. After completion of the baseline, dynamometer powered tests with the OEM converter at 1,134 and 12,140 service miles, the three-way converter was removed and replaced with the Bose System prototype, leaving all other OEM pollution accessories in place, including the controlled electronic ignition combustion and the exhaust gas re-circulation systems. Eight dynamometer test results, using the 1975 CVSII Federal Test Procedure (FTP), were used to verify the repeatability and lifecycle of the Bose System over 50,000 service-test miles. All tests were performed at the Gulf Research Laboratory, Pittsburgh, Pa. The comparative test results are disclosed later.

BACKGROUND OF THE INVENTION

The present invention relates generally to a method for the purification of exhaust gas of internal combustion engines and more particularly to an apparatus for significantly reducing the amount of incompletely burned fuel that is discharged from the exhaust system of an internal combustion engine to the atmosphere, thereby increasing the said engines fuel economy.

FIELD OF THE INVENTION

The exhaust gases which are emitted from present day automotive vehicles using unleaded gasoline consist primarily of unburned hydrocarbons (HC), carbon monoxide (CO), carbon dioxide ($CO_2$), other natural by-products of combustion and nitrogen oxides (NOx). The CO gas when inhaled by humans combine with their blood cells and prevents them from conveying the oxygen ($O_2$) content of air to their lungs, causing breathing problems. The HC and NOx constituents combine in the presence of heat and sunlight as they escape into the atmosphere to form Ozone (smog). Inhalation of Ozone has been documented to cause lung cancer. However, leaded gasoline operated automobiles also emit lead particles which causes lead poisoning if ingested by humans. Whereas, the diesel operated automobiles are known to emit micron size, carbon particles and sulfur dioxide/trioxide gases. The carbon particles are embedded in the human lungs, if inhaled and are known to cause lung cancer. The sulfur and nitrogen oxide gases are dissolved in rainwater to create acid rain which have devastated some forest lands through out the world.

Additionally, recent research has established that carbon dioxide ($CO_2$)~the main exhaust gas component although not a pollutant gas has been proven to be a green house gas (GHG). These gases are trapped in the lower atmosphere and prevent the radiation of solar heat from the earth's heated surface to the atmosphere thereby causing Global Warming. For reducing this warming, it is of paramount importance to reduce the generation of GHG or carbon dioxide gases by the conservation of fuel/energy in all types of internal combustion engines, which currently use about one-quarter of our national petroleum consumption.

For the protection of our environment, the US Clean Air Act, 1970 stipulated the maximum emissions permissible for the various pollutant gases from new cars as under:

HC=0.41 gram/mile, CO=4.0 grams/mile, NOx=1.0 gram/mile. These values were to be observed in a Cold Start, Dynamometer Test run per the 1975 CVSII FTP. There was no requirement for in-use car tests or permissible reduced standards. However, twenty years later, the US EPA observed the progressive degradation of the air quality of the one hundred largest U.S. cities to below the mandated limits of the said Act. The cause for this degradation was traced to the failure of the Catalytic Converter System~the sole automobile emission control system available ever since 1974~by the deposit of lead particles on the platinum catalyst from the small quantity of lead in today's blend of the "lead free" (unleaded) gasoline. The non-methane HC gas conversion efficiency as a function of lead concentration on the catalyst of a three-way catalytic converter degrades from 100% to 48% with 0.01% ~10% by weight of lead deposited on the catalyst: Reference: "Internal Combustion Engine Fundamentals", Dr. John B. Heywood, Prof. Mech. Engineering, Massachusetts Institute of Technology, 1988, FIG. 11–55. McGraw Hill Publications.

Similar degradation of the OEM catalytic converter has been recorded in the Federally-sponsored, "Reliability and Lifecycle Testing of The Automobile, Anti-Air Pollution and Energy Conservation System, hereafter referred to as the Bose System." US D.O.E Report, March 1980. During the U.S.D.O.E dynamometer controlled, 50,000 miles lifecycle tests with the Bose System, the OEM catalytic converter was tested at 1,134 miles (Test #1) and 12,140 miles (Test #2), before the removal of the converter and installation of the Bose Experimental System. The emissions control (grams/mile of the pollutant gases) and gravimetric fuel rates (m.p.g.) as recorded for Test #1(new converter), Test #2 (converter at 12140 miles), Test #9 (Bose System at 32,500 miles) and Test #12 (Bose System at 49.000 miles) are shown below

| Test # | Miles | HC gm/mi | CO gm/mi | NO$_x$ gm/mi | (HC + CO + NO$_x$) Total Emissions | Emission Efficiency | Fuel (m.p.g.) | Fuel Economy |
|---|---|---|---|---|---|---|---|---|
| New Car Stds. | | 0.41 | 4.0 | 1.00 | 5.41 | 100% | — | -12% |
| 1 | 1,134 | 0.72 | 5.31 | 2.11 | 8.14 | 66% | 11.76 | (Penalty) |
| 2 | 12,140 | 0.94 | 18.72 | 1.81 | 21.47 | 25% | 13.37 | Baseline |
| 9 | 32,500 | 2.25 | 12.82 | 2.88 | 17.95 | 30% | 14.12 | 5.6% |
| 12 | 49,100 | 2.07 | 14.22 | 1.86 | 18.15 | 29.8% | 14.26 | 6.7% |

The emissions control efficiency recorded for the Bose Experimental System was constant at 30% of the new converter efficiency. However, the new converter's efficiency dropped from 100% to 66% at 1,134 miles, 25% at 12,140 miles and a projected 5% at he end of its 50,000 miles' service life. A lifecycle pollutant emissions study based on these test data has estimated that the lifecycle pollutant emissions for the catalytic converter is 2,621,488 grams as compared to the Bose System's emissions of 900,000 grams. The Bose System's fuel economy based on the converter's fuel consumption was 6.7% in city driving and 19% in highway driving conditions.

Extensive road tests made with the preliminary prototypes of the Bose System on cars operating with leaded fuels in 1973, showed that the System was functional. The System separated the pollutant gases along with lead particles, from the fully burned carbon dioxide gases which were allowed to escape to the atmosphere. However, it was observed that the smaller lead particles were emitted along with the lighter pollutant gases via the turbine hollow shaft and slight accumulation in the mixing chamber contaminating its sodium hydroxide solution. Also, very large lead particles were observed to be exiting from the outlet pipe of the second stage separation's gas collector chamber, which were being deposited in the mixing chamber, with much heavier contamination of the sodium hydroxide scrubber solution.

The creation of these unusually large lead particles was traced to the "agglomeration of particles" phenomenon observed on the inside surface of the said gas collector chamber, caused by the particles high speed, hot impact at 90 degrees angle of incidence with subsequent re-boundings. Such rebound impacts created a "scoring" and roughness on the gas collector inside surfaces, whereon larger particles were noticed to grow before being dislodged. This adverse phenomenon required frequent scrub down of the gas collector inside surfaces and needed further research for overcoming these "agglomeration" problems. Fortunately, by Mar. 4, 1974~the filing date of my prior Art: U.S. Pat. No. #3,861,142~the Federal/State laws had been promulgated for the exclusive sale of unleaded gasoline through out USA. Also, I lacked the funds needed to carry out the said research. This research has been done during the last few years~particularly, as the demand for the micronsize carbon particles separation/re-combustion from the diesel operated, internal combustion engines exhaust, have become critical from the point of view of health and fuel/energy conservation. My present invention describes the new technology developed for reducing the "agglomeration of particles" problem that makes the Bose System universally interchangeable between the internal combustion engines operated by leaded or unleaded or diesel or natural gas fuels respectively.

DESCRIPTION OF THE RELATED ART~37 CFR 1.97 AND 1.98

Most previously used processes for separating gases of dissimilar molecular masses, and, or lead or carbon particles generally have required complex and expensive equipment, and additionally must be carefully controlled in order to effect the desired separation. Other devices suffer from serious disadvantages, such as, generally requiring the application of external energy for speeding up the gas to gas or gas to particle separation.

Examples cited are: U.S. Pat. Nos. 4,622,051; 4,649,703; 4,989408. These three processes depend upon the use of high voltage field for the electrostatic precipitation of the micron size carbon particles in the diesel exhaust to create larger particles build-up on the cyclone chamber walls, for their easier removal during the subsequent centrifugal separation process. Thus, the "particle agglomeration" effect is being promoted in these patents, in spite of loss of external electrical energy and the potential heat loss from the smaller micron- size, carbon particles lost in the "agglomeration" process. Thus, U.S. Pat. No. 6,176,889 B1 requires a rotating impeller to provide centrifugal effect to the contaminated gas flow. Similarly, U.S. Pat. No. 6,200,361B1 needs high air velocity to operate system and is cumbersome for automotive use. U.S. Pat. No. 3,815,337 comprises a cylindrical cyclone chamber with circumferential slots which discharge carbon particles into an "agglomeration" chamber packed with wire mesh to catch these particles. This system is bound to give significant pressure drop and does not re-cycle the separated carbon particles and will thus be very energy in-efficient.

All or some of the listed factors in the penultimate paragraph, together result in an impractical size from the standpoint of space requirements for automotive uses. Examples cited are: U.S. Pat. Nos: 2,789,032; 3,793,807; 3,918,937; and 2,954,841; 3,712,029; 5,053,063. In U.S. Pat. No. 5,053,063, SISK uses polymer or "Teflon" tubes for collecting dust particles in a "Dust Filtering and Collection System" by allowing passage of the dust laden air stream through the micron size pores of the tubes, and relies mainly on one characteristic of the polymer or "Teflon" tubes, namely low friction to enable the drop off of particles collecting on tube sides. Sisk also uses vibrating means to dislodge adhering particles. Whereas, my present invention uses an industrial low-friction, as well as, high-temperature and abrasion—resistant coating, which are two very important characteristics relied upon by me, in selecting from a plurality of thermosetting and inorganic coatings, including TEFLON or Porcelain Enamels, in order to successfully solve the said adverse "agglomeration of particles" phenomenon discovered with my present invention. Thus, in the light of U.S. Pat. No. 5,053,063 by SISK, my present invention is not obvious.

In brief description of my prior Art: U.S. Pat. Nos: 4,399,107; 4,235,845; 3,892,070 ; 3,861,142 and Canadian Patent No: 1,104,060 shows and claims the basic combination of turbine impeller and conical vortex tube. Thus, an engine exhaust effects the rotation of a turbine impeller which increases the speed of exhaust gas passing there through into the conical vortex tube, wherein the whirling gas mass is centrifugally stratified into a core of lighter unburned combustible gases fed back from the larger end of the vortex tube to the engine via a mixing chamber containing a water/sodium hydroxide charge that dissolves out the pollutant gases, such as formaldehyde and nitric oxide, while an outer layer of heavier gas exhausts at the smaller end to the atmosphere.

U.S. Pat. No. 3,861,142 improves the combination in salvaging from the component of heavier gas outer layer certain separated heavier gas component and fed back to the engine, passing through a mixing chamber containing a water/chemical charge that removes by dissolving the pollutants such as acetaldehydes and nitrogen oxides. A final portion comprising lighter non-combustible components of the heavier gas layer passes to exhaust at the smaller end of the vortex tube.

U.S. Pat. No. 3,861,142 effects gas separation in two stages instead of the single stage shown in U.S. Pat. No. 3,892,070. Both teachings use a turbine impeller having dimensions based on a six-cylinder engine (Ford Fairlane, 1965, 200 c.i.d) as noted in U.S. Pat. No. 3,861,142.

U.S. Pat. No. 4,235,845 and Canadian Patent No: 1,1 04,060 improved the arrangement of the vortex separation. This patent also effects improvements over the teachings of my prior patents. Thus, it was found that an increase in the number of blades on the turbine impeller to a multiple of twice the number of cylinders e.g., for an eight cylinder car to sixteen blades on the impeller increased the velocity energy of the exhaust gases in the vortex tube by an increase in the energy conversion efficiency of the turbine. A stator wheel upstream of the turbine impeller with gas entry to the stator wheel reduces turbulence, and more importantly, a stator wheel downstream of the turbine impeller overcomes a slow down of the turbine as seen in tests at about 1300 rpm in at least two different automobiles, i.e. six and eight cylinder engines. It was discovered that this was due to the exit gas from the impeller, when going into the vortex tube, was actually spinning in a reverse direction from the rotational direction of the impeller, which resulted in a reduction of the separated lighter gas components. The advantage of this simple expedient of a downstream stator wheel was a significant improvement in the amount of lighter combustible and pollutant gases separated.

U.S. Pat. No. 4,399,107 improved the wet chemical chambers for the purification of the separated lighter and heavier pollutants by their combination into a compact, integral body for positioning ease under the hood of existing automobiles.

BRIEF SUMMARY OF INVENTION

Among the several objects and advantages of the present invention may be noted:

the prevention of atmospheric pollution by carbon monoxide, unburned hydrocarbons, nitrogen oxides, sulfur oxides, aldehydes, lead and carbon particles heretofore emitted in substantial proportions from the exhaust gases of internal combustion engines, and principally such engines of the type powering automotive vehicles;

the provision of a new and improved apparatus for separating the different gaseous and particle components constituting the exhaust gas emission from automotive vehicle-type internal combustion engines for the purpose of appreciably reducing the proportion of harmful and, or pollutant gases/particles being present in such gases which are emitted into the atmosphere;

the provision of an improved apparatus for separating gases/particles in a gas/particle mixture having different molecular weights/densities, which is compact, continuously operative, inherently reliable and may be simply and inexpensively manufactured and retrofitted to all existing and in-use automotive vehicles;

the provision of a novel and improved apparatus which may be universally applied for separating the combustible gases/particles from the noncombustible gases/particles in the exhaust gas being emitted from any type of solid, liquid or gas burner and which increases the thermal efficiency of the same by permitting the return of the combustible gases/particles to the burner for subsequent re-combustion.

In accordance with the teachings of the present invention, it has been found that the foregoing objects and their attendant advantages can be realized with a conventional internal combustion engine, such as is used in automotive vehicles, by providing an anti-exhaust gas pollution and thermal regenerative device having no moving parts and which, when connected to the exhaust or tailpipe of such vehicles, operates automatically to substantially separate the heavier incombustible or fully burned, components from the lighter combustible, or only partially burned components of the exhaust gas, and recycles the lighter, unburned components, causing the same to be directed back into the air-intake of the engine for further or complete combustion.

This device simply comprises an elongate converging, vortex tube which terminates in a small discharge outlet at one end and fitted with a down-stream stator wheel, at its large junction end with the cylindrical housing of the turbine impeller and immediately adjacent to the impeller. A suitable support for the impeller is provided on a hollow axial rotary shaft, extending up to the large end of the vortex tube and exteriorly of the cylindrical housing carried on high temperature/high speed ball bearings, within the cylindrical housing, the outer end of which is fashioned into an annular chamber for the circulation of the bearing's cooling water from the engine's radiator. An upstream stator wheel is mounted to the inside of the cylindrical housing of the turbine impeller and immediately ahead of it. An inlet pipe is arranged and disposed near the closed, wall end of the cylindrical turbine housing for discharging the exhaust gases from the engine tangentially, or peripherally therein.

As the engine exhaust gas is introduced through the inlet pipe, it is directed through the upstream stator wheel for reducing the gas turbulence before its impact on the turbine impeller blades. The expansion of the gas through the turbine blades causes the turbine to speedup considerably, which increases the speed of the exhaust gas mass passing there through into the downstream stator wheel and into the conical vortex tube, wherein the convoluting gas mass is centrifugally stratified into three layers, in accordance with their molecular weights: the inner core comprises of the lighter combustible hydrocarbons and nitric oxide gases which are fed back through the hollow shaft of the gas turbine to the gas mixing chamber/sodium hydroxide scrubber, wherein the nitric oxide gases are dissolved out prior to their re-combustion in the engine; the middle layer comprises the non-combustible, fully burned carbon dioxide gases which exit to the atmosphere through the small end of vortex tube; the outermost layer comprises the heavier combustible hydrocarbon gases, non-combustible nitrogen dioxide gases, sulfur dioxide/trioxide gases, aldehydes , lead/carbon particles which are separated through elongated, radial slots milled at the smaller end of the vortex tube and collected in the second separation stage chamber, prior to their re-circulation to the engine after being treated through a plurality of air filter assemblies for the progressive removal of nitrogen dioxides, sulfur trioxides, aldehydes and lead particles.

The present invention teaches a new technology for reducing the "agglomeration of lead/carbon particles" phenomenon by (a) milling the radial slots of vortex tube at a tilt angle 30 degrees to vertical, with the tilt conforming towards the exit pipe of said second separation stage chamber, (b) by applying an industrial coating to the said chamber's inside surface selected from a plurality of a low-friction, high temperature, abrasion-resistant coatings. Additionally, the present invention teaches the use of a plurality of compressed air in-line filter assemblies as an improved apparatus than the chemical chambers of my prior Art, for removal of aldehydes, sulfur, sulfates, nitrogen dioxide, water vapor and lead/carbon particles from the separated and combustible, heavier hydrocarbon exhaust gas stream of the leaded gasoline/diesel engine exhaust, by their centrifugal dispersal and selective removal by the passage of the separated gases through the top stator vanes and porous elements of the said plurality of air filter assemblies.

BRIEF DESCRIPTION OF THE DRAWINGS

The present invention is shown in the accompanying drawings wherein.

DETAILED DESCRIPTION OF THE INVENTION

Figure 1:
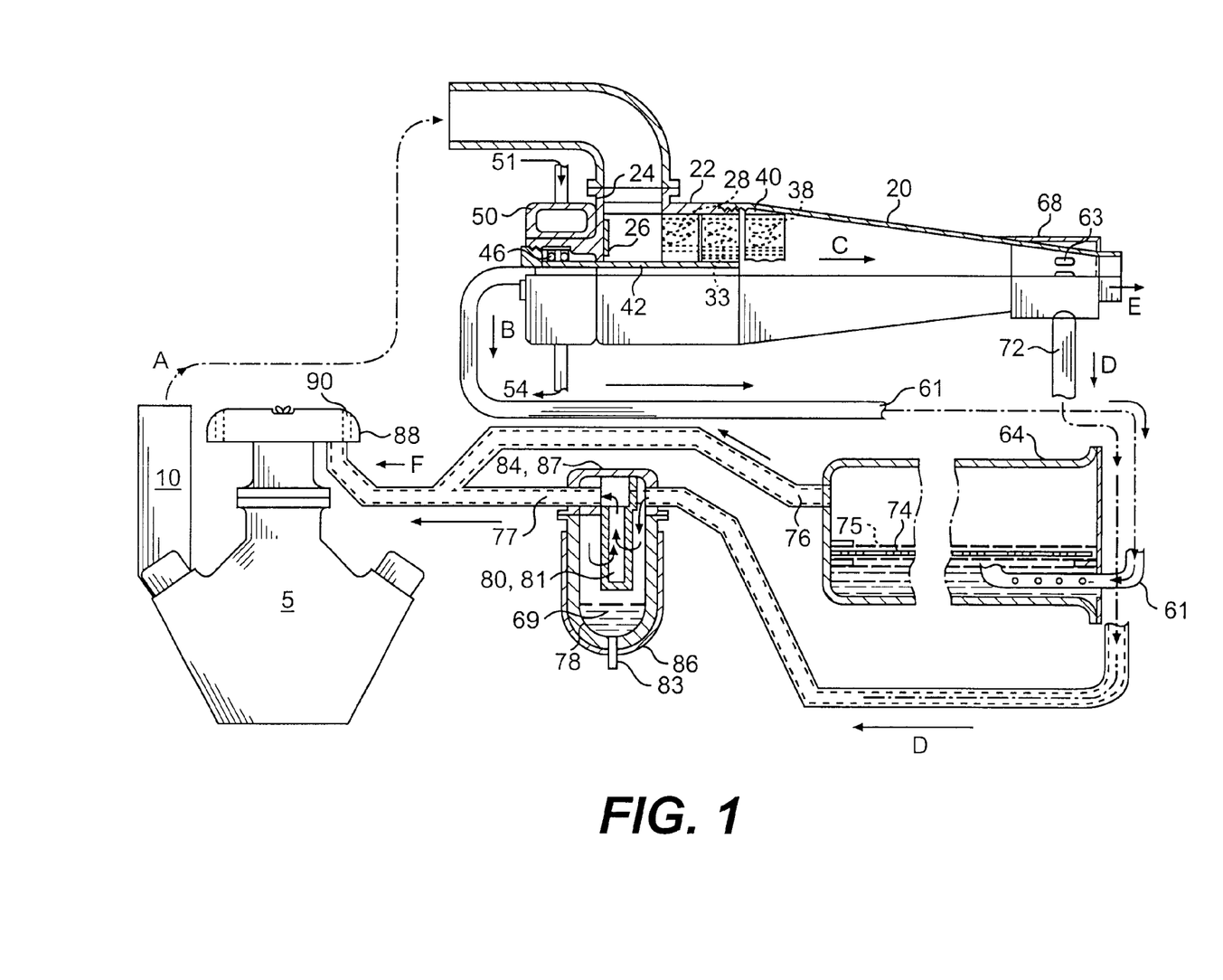
FIG. 1: is a diagrammatic illustration of the overall System and its essential components as installed on an automobile.

The anti-air pollution and energy conservation system for the present invention may be used on automobiles using leaded or unleaded gasoline, or diesel fuel or natural gas, as illustrated in FIG. 1 of the drawings. The alphabetical reference characters A–F designate the gases or gas mixtures as follows:

| Arrow | Gases |
| --- | --- |
| A: | Exhaust from engine manifold, gas mixture of combustible and non-combustible gases, feed to rotate the turbine impeller. |
| B: | Lighter inner core of gas mixture comprising primarily combustible gas, including, carbon monoxide, nitric oxide, ethylene, methylene, ethane, Methane. |
| C: | Heavier of the heavy outer layer of gas mixture of combustible and non-combustible gases, such as, propane, butane, nitrogen dioxide and the lighter of the heavier gases such as, carbon dioxide, water vapor with some traces of nitrogen oxide, butane, propane. |
| D: | Substantially, a mixture of the heavier of the heavy gases, as above. |
| E: | Substantially, a mixture of the lighter of the heavier gases, as above. |
| F: | Mixture of combustible light and heavy pollutants passing to the carburetor and related air filter housing (Through the porous filtration stages and water scrubber to be described). |

In FIG. 1 of the drawing, the exhaust manifold of engine 5 connects via pipe 10 to the inlet at the larger end of the vortex tube 20, this being a cylindrical housing 22 to which the vortex tube connects, and having entry port 24 connecting to pipe 10. Within such housing is a heat shield 26 and stator wheel 28 secured upstream of turbine impeller wheel 33, downstream of which is a further stator wheel 38 located at the larger end of the vortex tube and secured by welding as at 40.

A suitable support for the impeller is provided on a hollow steel axial rotary shaft 42 extending up to the large end of the vortex tube and exteriorly of the cylindrical housing carried on a pair of high temperature, steel ball bearings 46, within the cylindrical housing of the outer end of which is fashioned into a hub from which radially extends the engine radiator-water cooled Housing 50, water pipes 51, 54.

The cylindrical housing may, as shown, be a single integral aluminum casting along with the exhaust gas inlet port 24. The stator wheel 38 can be fixed inside the front end of vortex tube in any obvious manner, as by welding,shrink or force fitting, splining.

It will be apparent from the above description that exhaust gases from pipe 10 in the direction of Arrow A, enter stator wheel 28 where they are deflected to smoothly pass through to the impeller 33 effecting rotation of the impeller carried on the bearings 46 via shaft 42. In this instance, the gases enter into the impeller and emerge from the stator 38 spinning in a direction to centrifugally stratify in the vortex tube 20. Thus, the core of the lighter gas mixture passes reversely through the hollow shaft 42, in the direction of Arrow B, through pipe 61 to the water scrubber chamber 64. This effects the First Separation Stage components as installed on an automobile.

However, the mixture of heavier gases moves in the direction of Arrow C and, still rotating upon reaching the outer smaller end of the vortex tube 20, the heaviest combustible gases, comprising the heavier hydrocarbons, aldehydes, NOx, carbon sulfur sulfates particles for Diesel exhaust or lead, sulfur, sulfates particles for leaded gasoline exhaust emerge through the ports 63 into the Second Separation Stage chamber 68 and then via pipe 72 in the direction of Arrow D to the "Compressed Air Filter Assembly" 87. The lighter of the heavier gases (Carbon Dioxide-CO2) which are non-combustible, are exhausted to the atmosphere at the end of the vortex tube, see Arrow E.

As heretofore mentioned in this invention, the lead and carbon solid particles discharged in the exhaust gas stream of the leaded gasoline and diesel fueled automobiles, were also centrifugally separated and included in the heavier pollutant gas stream pipe 72. It was experimentally determined that they tended to clog and contaminate the chemicals in the Chemical Chambers within a short time period. Hence, recourse had to be made for the use of a commercially available, Compressed Air Filter Assemblies, as shown in Items 84,87 FIG. 1, instead of the Chemical Chambers C.1 and C.2, FIG.1 of U.S. Pat. No. 4,399,107. This Assembly comprises of an aluminum body consisting of inlet port and outlet port of ½" NPT screwed orifice to attach to pipe 72 and 77 conveying the separated heavier hydrocarbons, NOx, aldehyde gases and carbon/lead/sulfate particles. This gas and particle flow enters the polycarbonate bowl Item 78 wherein is interposed a Filter Elements 80,81 made of sintered polypropylene. This filter element is available with pores varying from 5, 25 , 40 microns or larger sizes. Thus, one or more of the said air filter assemblies with varying pore sizes of filter elements, may be interposed between the separated heavier gas flow pipes 72 and 77, in order to efficiently separate and collect in their polycarbonate bowls: Item 78, the aldehydes, lead, sulfur & sulfate particles and NOx with the water vapor but allowing the heavier hydrocarbons (i.e. butane, pentane) and the combustible carbon particles, which are known to be between 15 to 25 microns size, to be transported to the diesel engine air intake filter via pipe 77.

The said air filter assemblies are designed to operate with compressed air supply at up to 125 F. temperature, 150 psig pressure and 75 scfm flow rate. The said operating parameters are within the requirements of the present invention. This method of Differential Separation of carbon particles from lead, aldehydes, sulfur, sulfate and water vapor by the use of air filter assembly 'elements' of varying porosity is a novel process, which will be one of the claims of this improved invention. However, the construction of this filter assembly will be of no patentable moment herein. The reason for the removal of the higher aldehydes from the heavier pollutant gas stream before their recycling into the auto-engine is that these create a combustion inhibition problem in the engine resulting in increased hydrocarbon emissions.

Referring back to the stator 28, the placement of such a stator before a turbine impeller is of conventional practice. However, the placement of the stator 38 down stream of the impeller 33, while of apparent conventional practice, is by no means for conventional effect found in gas turbines. Experimentation and testing brought to light the puzzling effect that the lighter gases through the pipe 61 were being slowed up for some reason or other at an engine speed of about 1300 rpm. in at least two different test automobiles. It was ultimately discovered that the rotating gas mass leaving the turbine impeller blades was spinning in a direction opposite to the rotational direction of the impeller. It was further found that such opposite directional rotation was slowing down the lighter combustible gas mixture passing through pipe 61. Accordingly, in order to prevent such opposite rotation of a gas mixture leaving the turbine impeller, the stator 38 was added in order to redirect such gas mixture in to the same rotational direction as the impeller. The result produced was that the passage of gas mixture in the core of the whirling mass in the vortex tube faced lesser flow resistance in passing through the sleeve 42, Thus, the slow-down of gas flow in pipe 61 was alleviated.

A further beneficial effect was found in the addition of the stator 38, in that it improved the separation quantity of the lighter gas mixture passing from the vortex tube through the hollow shaft 42 and likewise increased the quantity of heavier gas mixture passing toward the second separation stage 68. This is attributed to the increased conversion of exhaust gas pressure energy into higher velocity energy effected by the presence of the stator 38. Thus, an overall improved separation effect was noted.

While still on the subject of the turbine, and whereas in my prior patent it was stated that the impeller should have a number of blades equal to the number of cylinders in the engine or a multiple thereof, it has now been ascertained that, by using a multiple of two, the impeller speed for a particular exhaust velocity is considerably increased. Thus, an actual experimentation with an eight-cylinder engine, it has been found that providing sixteen blades on the impeller considerably enhanced the rotational speed of the gases passing there through. Also, by virtue of the stator 38 which prevented the opposite rotation of such gases with regard to the turbine impeller, the greater rotational speed produced a stronger centrifugal separating effect between the heavier and lighter gas components.

As heretofore stated in connection with the mixing chamber 64 containing a concentrated solution of Sodium Hydroxide (Na OH) in water, the lighter inner core of gas mixture primarily consisting of carbon monoxide (CO), lighter hydrocarbons(HC), nitric oxide (NO) and formaldehyde (HCHO) gases emerge from pipe 61 for upwardly bubbling through the water bath 64 for removal by absorption of the (NO) and (HCHO) gases. In this instance, a catalytic plate 74 of zinc is carried in the water bath with in the chamber approximately ¼" below the water surface 75 and is provided over its area with ³⁄₁₆" apertures separated from each other by approximately ½" center to center. Such a catalytic plate was disclosed in my U.S. Pat. No. 3,861, 142. It has been experimentally determined that the sodium hydroxide solution reacts with the NO gas to form a precipitate of sodium nitrite/nitrates. It has also been determined experimentally that the upwardly bubbling of NO and HCHO gases yield higher removal rates of these gases than by the previous method of their injection over the water surface 75: See U.S. Pat. No. 4,399,107. Also, this sodium nitrite/nitrate mixture in water resists freezing during winter and precludes any block-off of the recycling gases. The volume and concentration of this sodium hydroxide solution in this water bath will be such as to last for 3,000 miles and will be replenished at every engine oil change. The particular structure of the chamber and the support means of the catalytic plate are of no patentable moment herein and any suitable construction is usable, as well as, emptying and filling fittings.

Finally, the lighter hydrocarbon and carbon monoxide gases (after the absorption of nitric oxide and formaldehyde gases) are conveyed through the outlet pipe 76 and introduced into bottom of the air filter housing 88,90. Likewise, the heavier hydrocarbon gases along with carbon particles for diesel exhaust (after the porous filter separation of water vapor, aldehydes, sulfur,sulfates, NOx, and lead particles in the leaded gasoline application) are conveyed through pipe 77 and co-mingled with pipe 76 gas contents prior to their recycling into either the engine air-intake pipe or bottom of the air filter housing 88 and within filter ring 90. The re-cycled mixture of lighter and heavier pollutant gases are sucked in by virtue of the carburetor/turbocharger air intake vacuum and burnt with significant reduction of exhaust pollution and fuel economy gains. An alternate method of gas input to the engine air intake could be through a vacuum control valve operated by engine manifold vacuum and set to open for recycled gas flow to the engine at between 13" and 16" of vacuum. Various other arrangements can also be made.

Although U.S. Pat. Nos. 4,399,107 and 4,235,845 had used air-fins (Item. 50, FIG. 1) for cooling the high-temperature ball bearings of the turbine's hollow shaft, it was found that air cooling was insufficient to prevent the relative expansion of the steel hollow shaft within its ball bearing sleeves, thereby changing its operating clearances. This change in assembly clearance caused the turbine to slow down at peak exhaust gas flow, reducing the system's gas separation efficiency. Also, it caused the ball bearing to "seize up" after 25,000 miles of service runs. In order to guarantee a 50,000 miles service life for this invention, an improved engine radiator water cooled housing has been included in the present invention (See FIG. 1, Item 50).However, the impeller & stator wheels are of the shrouded type as used in prototype experiments & testing, and referred to in U.S. Pat. Nos. 4,399,107 and 4,235,845. Further, in these prior patents, the gases which had to be scrubbed in the water chamber for removing the formaldehyde and nitric oxide gases, were introduced at the surface of the water charge to overcome the stoppage of the system due to freezing of the water charge during winter. It has been discovered that better removal of formaldehyde and nitric oxide pollutant gases from the separated lighter exhaust gas stream, B is possible, if these gases are bubbled upwardly through a water charge of concentrated sodium hydroxide. The nitric oxide (NO) gases react with the sodium hydroxide (Na OH) to precipitate out as sodium nitrite (NaNO2)—a harmless fertilizer. It has also been found that the sodium hydroxide solution as the solvent charge does not readily freeze during winter. This discovery has been included in my present invention: See FIG. 1, Item 64 and detail, Item 61). Gas analysis laboratory tests showed that certain higher aldehydes were present in the separated heavier exhaust gas stream. My prior U.S. Pat. Nos. 4,399,107 and 4,235,845 had used chemical chambers (Refer Items C.1 & C.2 FIG. 1) containing potassium dichromate (K2Cr2O7) solution for oxidizing and sodium bisulfite(Na HSO3) solution for absorbing these aldehydes, during the passage of these gases en route to the auto-engine, as these gases inhibit the engines combustion.

While the chemical treatment of the separated heavier pollutant gas stream was beneficial in automobiles using unleaded gasoline, this wet process is unsuitable for automobiles using leaded gasoline or diesel fuel. The lead in the gasoline and carbon in the diesel fuel are released as solid particles in their exhaust gas stream. These particles centrifugally separate out from the main exhaust gas stream in to the separated heavier pollutant gas stream and later on, contaminates the chemical bath within a short operating period.

The present invention has overcome this problem by substituting a plurality of specially selected, in-line air filter assemblies normally used for separating the water vapor and particles from compressed air supply, in place of the chemical chambers. See FIG. 1, Items 84 & 87. The separated heavier pollutant gas stream, D as it flows at a high speed, into the polycarbonate bowl 78 of the air filter assemblies, it convolutes through its top stator vanes prior to flow through the 25~40 micron size holes in the polypropylene filter elements (Items 80&81) of the filter assemblies. Such convolutions drop the heavier lead, sulfur particles, and the sulfate, aldehydes and nitrogen dioxide coalesces in water droplets, 69 into the bottom of the bowl, wherein it is periodically discharged to the roadway by means of an automatic, preset relief valve 83. It may be noted that the combustible carbon particles in diesel exhaust are between 15~25 microns size, whereas the lead, sulfur particles and the coalescent aldehydes, sulfates and nitrogen dioxide gases in water vapor particles in the leaded gasoline or diesel engine exhaust are about 40 micron or higher size. Thus, in order to filter out the lead, sulfur particles along with the aldehydes, sulfates, nitrogen dioxides coalesced with some water vapor, it is necessary to interpose an initial compressed air filter assembly FIG. 1, 84. with a filter element of porosity 40 microns or higher. The carbon particles in diesel automobiles exhaust which are of much finer size, usually 15 microns to 25 microns, will pass through this filter element pores of 40 micron size, along with the heavier hydrocarbons and nitrogen dioxide (NOx) gases along with some remaining water vapor.

These partially purified separated heavier pollutant gases now enter the second air filter assembly 87 which is fitted with a finer filter element 81 with 25 microns pore size. Due to this element's finer pore size, the NOx gases with the remaining water vapor are centifugally separated out, as the inflowing gases convolutes through the stator vanes of this element and are filtered out through pipe 77. Thus, the heavier hydrocarbon gases with the 15~25 micron carbon particles are re-cycled into the air intake 88,90 of the diesel or leaded gasoline engine, thereby yielding significant reduction of exhaust pollution particularly, the cancer-causing, carbon particles, and higher fuel economy.

Since no engine modifications except its tune-up to reset the engine's idling speed to the manufacturer's specifications are required and accomplished by advancing the diesel engines fuel-cutoff timing or reducing the air-fuel ratio in the leaded gasoline engine, this invention can be easily retrofitted on all such existing automobiles world-wide.

Past experimentation with the prior art of this invention on an automobile using leaded gasoline confirmed significant centrifugal separation of lead particles from the main exhaust gas stream into the separated heavier pollutant gas stream. Also, significant amounts of lead particles dropped out inside the second separation chamber (FIG. 2A, Item 68), due to (a) the radial nature of discharge of the separated solid particles caused because of radial slots provided in my prior art described in U.S. Pat. No. 3,861,142. The radially discharged particles impinged perpendicularly on the inside surfaces of the said separation chamber and bounced back radially, rather than follow an orderly convoluting gas flow around the chamber. (b) The said impingements tended to create abrasion marks and roughness on the inside surface of the said chamber, thereby causing the "agglomeration" of the said separated particles on the said chamber walls, which (c) further increased the roughness on the said wall, causing significant frictional resistance to the convoluting gas flow and loss of efficiency in the transport of the said particles.

Figures 2A, 2B:
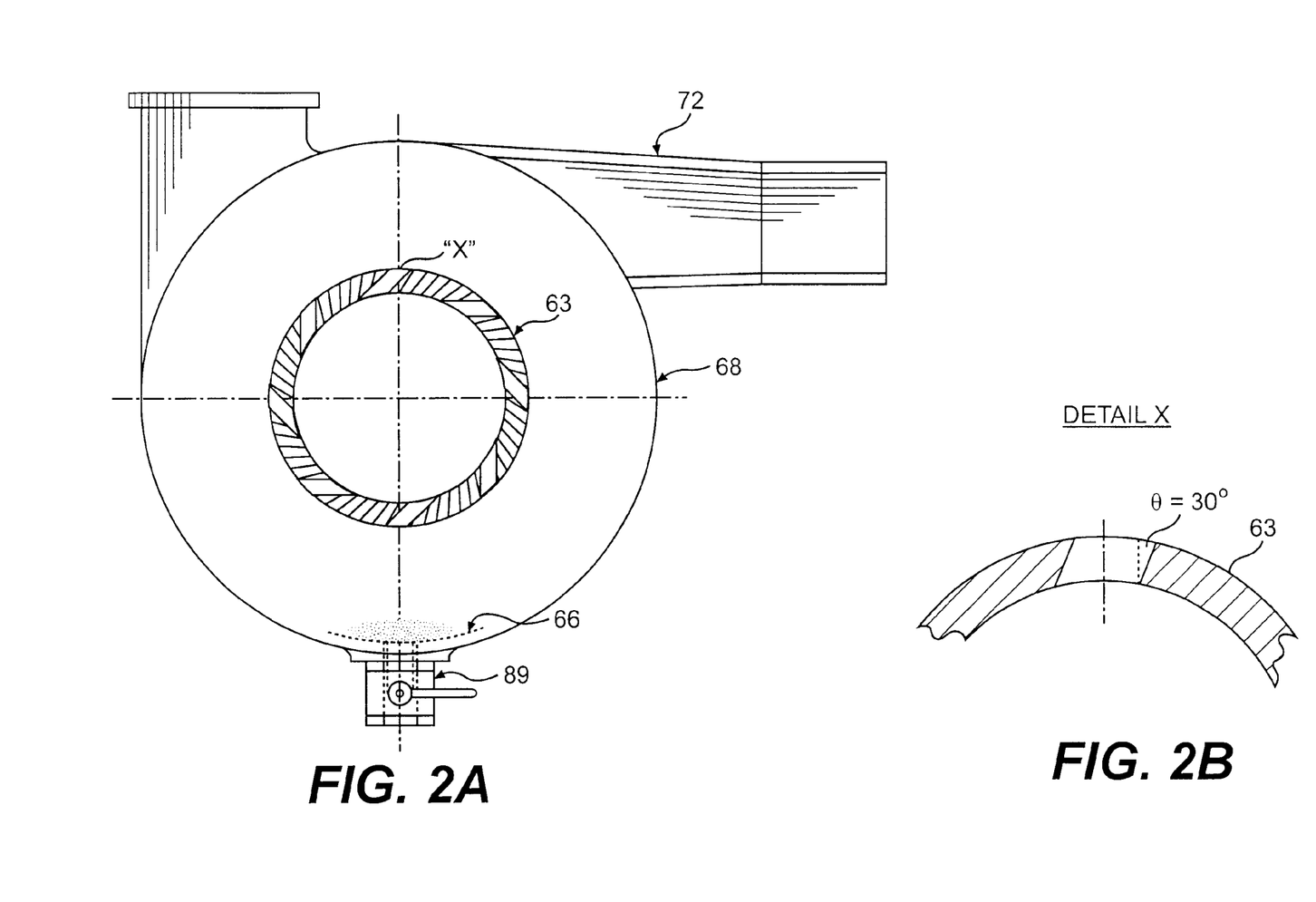
FIG. 2(A): is the cross-sectional end view of the Second Separation Chamber of the System's conical vortex tube located at its smaller end.
FIG. 2(B): is the cross-sectional detail of the vortex tube small end, radial slots

It was discovered that the application of an Industrial low-friction, high-temperature and abrasion resistant coating, cost-effectively selected from a plurality of thermosetting and inorganic coatings, including TEFLON suitable up to 350 degrees F.~(Trademark for phenolic resins~Ellison Insulations Ltd, Britain), or Porcelain Enamel coating suitable up to 700~1200 degrees F. (Item 66) made on the inside surfaces of said chamber (Item 68) can significantly reduce the lead and other solid particles' drop-out and increase their transport down stream via delivery pipe (Item 72). Reference: Modem Manufacturing Process Engineering, by B. W. Niebel, McGraw Hill, 1989, Tables 15.2 and 15.3.This enhanced separation efficiency due to the discovery of a plurality of high temperature/abrasion resistant and friction reducing coatings would also be applicable to carbon, sulfur particulate transportation in the diesel or other alternate fuel engine applications. This feature of the present invention is based on the advantage accruing from the principle of "stream-lined flow of gases" and allows the carbon, lead and sulfur particles with the separated heavier combustible gases from the second separation stage to collect efficiently in the delivery pipe (Item 72) for their transmittal to the air-filter assembly(s). This feature of my present invention is one of the important claims.

Additionally, it was discovered that changing the location of the delivery pipe (Item 72) to a tangential position on the periphery of the second separation chamber (Item 68) and conforming with the rotational direction of the convoluting exhaust gas mass, further raised the separation efficiency of the heavier pollutant gas stream. See FIG. 1 and FIG. 2A, item 72. Further more, it was discovered that machining the sides of the eight, ⅜×⅝" slots at the smaller end of the vortex tube to a 30 degree 'tilt' angle to the vertical axis, with the 'tilt' conforming towards the outlet pipe 72, improved the separation efficiency of the heavier pollutant gas stream and the carbon or lead and sulfur particles. See FIG. 2B. This feature of the present invention is based on the advantage accruing from the principle of "streamlined flow of gases." Thus, the 'tilt' angle machined to the slot's side exit edges allowed the separated, heavier gases along with the carbon or lead and sulfur particles to emerge in a free flow out of the slots and collect smoothly in the delivery pipe 72 for their transmittal to the air filter assemblies. Hence, this feature of my present invention is one of the notable claims submitted.

In spite of these improvements, some of the larger lead particles continued to drop out into the bottom of the second separation chamber, Item 68. A manually operated, two-way, ⅜"NPT brass ball valve was installed at the bottom, in order to periodically remove such sediments in automobiles of average usage. However, an electrical solenoid-activated, 12-Volt, two-way ⅜" ball valve is available for application on high-usage automobiles, and/or diesel buses, trucks of larger engine size, in order to automatically remove such sediments at every engine switch-off. See FIG. 2A, Item 89. These utility developments of the second separation chamber are important features and claims of this invention.

The present invention process of centrifugally separating the lighter combustible pollutant hydrocarbon, carbon monoxide and the heavier combustible pollutant hydrocarbon gases along with the carbon particles from the fully burned non-combustible gases, and recycling the combustible and pollutant gases and carbon particles into their internal combustion engines for reducing their exhaust pollution and thereby increasing their fuel economy, can also be applied to the Alternate Fuel engines, including natural gas engines. These engines also emit carbon particles although of a smaller size, in their exhaust gas stream along with a high concentration of air pollutants, including carbon monoxide and nitrogen dioxides.

What is claimed is:

1. A method of separating components of the exhaust gas mixture of an internal combustion engine operating with unleaded or leaded gasoline or diesel or natural gas fuel for subsequent re-cycling of pollutant components thereby reducing air pollution generated by the engine and increasing the fuel economy of the engine, said method comprising:

effecting a first separation of the exhaust gas mixture into heavier and lighter components wherein the lighter components are primarily combustible pollutants;

effecting a second separation in which the heavier components are separated into a first portion comprising substantially carbon dioxide and water vapor for egress to atmosphere and a second portion comprised substantially of combustible pollutants for subsequent combustion in said engine;

effecting a separation of the heavier lead, carbon, or sulfur particles from the second portion of the said second separation comprising the heavier combustible gases and 15~25 micron size carbon particles;

providing means for priodical and automatic removal of the heavier lead, carbon, or sulfur particles;

and mixing said second portion of said second separation stage including the combustible 15~25 micron size carbon particles with the lighter components effected in the first separation to effect a combustible mixture for re-cycle to said engine.

2. An apparatus for separation of the exhaust gas components of an internal combustion engine operating with unleaded or leaded gasoline or diesel or natural gas fuel, to reduce atmospheric pollution and increase the engine's fuel economy, comprising:

a first exhaust gas separating device and means for bringing exhaust gas thereto from an engine whereby exhaust gas is separated into its lighter and primarily combustible components substantially separated from its heavier and primarily non-combustible components;

a second separating device and means for conducting said heavier components thereto from the said first separating device;

a water scrubber containing sodium hydroxide solution and means whereby said lighter combustible components are fed thereto, for the removal by dissolving of the nitric oxide and formaldehyde impurities in the lighter gas component, resulting in purified lighter combustible gases;

said second separating device communicating with the atmosphere and having means to substantially separate heavier combustible gases of said heavier components from non-combustible gases;

means to feed said heavier combustible gases to a plurality of in-line compressed air filter assemblies for discarding in progressive stages, the gas impurities including aldehyde or sulfate or sulfur or nitrogen dioxide or the heavier lead and carbon particles resulting in purified heavier combustible gases;

means for mixing said purified heavier combustible gases including carbon particles of 15~25 micron sizes with the said purified lighter combustible gases resulting in a purified gas mixture;

means to feed said purified gas mixture to the said engine while said non-combustible gases egress to the atmosphere from an open end of the second separation device.

3. The apparatus as set forth in claim 2, where in said first gas separating device comprises:

an upstream stator, followed by an exhaust gas driven turbine and a conical vortex tube open at both ends and connected thereto at its larger end via a down stream stator, so as to receive the rotating gas discharge therefrom for separation therein into an inner gas core of primarily combustible lighter gases moving axially towards said turbine and an outer layer of said heavier gases moving axially in the opposite direction for separation in said second separating device into said primarily combustible and non-combustible gases;

said means for conducting said lighter gases of said inner core from said conical vortex tube to said water scrubber, and means to provide a hollow shaft for support of said turbine communicating with said vortex tube at the inner core region thereof.

4. An apparatus as set forth in claim 2, wherein said first gas separating device comprises:

an upstream stator, followed by an exhaust gas driven turbine and a conical vortex tube, open at both ends and connected thereto at its larger end via a down stream stator, so as to receive the rotating gas discharge therefrom for separation therein into an inner gas core of said primarily combustible lighter gases moving axially towards said turbine and an outer layer of said heavier gases moving axially in the opposite direction for separation in said second separating device into said primarily combustible and non-combustible gases.

5. An apparatus as set forth in claim 4, said second separating device comprising:

a plurality of elongated, horizontal slots machined on the smaller end of the said vortex tube, so as to afford a streamlined egress of the outer layer of heavier gases, including carbon, or lead and sulfur particles, into a gas collector chamber surrounding the said slotted area whereby the outer layer of heavier gases passing through said vortex tube exit therefrom through said slotted area into said gas collector chamber;

means provided for return to the said heavier gases including the carbon, lead and sulfur particles to the said plurality of in-line compressed air filter assemblies for discarding in progressive stages, the gas impurities including aldehydes, sulfates, sulfur, nitrogen dioxide and lead particles, while the relatively lighter inner core of primarily non-combustible gases and water vapor of said heavier outer layer, egress to the atmosphere at the said vortex tube small end.

6. The apparatus as set forth in claim 4, said second separating device comprising:

a plurality of elongated, horizontal machined slots on the smaller end of said vortex tube;

means provided for a gas collector chamber comprising a cylindrical shell, centrally mounted over said slots;

said gas collector chamber provided with a converging gas exit tube mounted peripherally and tangentially to the cylindrical shell of the gas collector chamber and centrally located over the said slots, whereby affording improved streamlined flow of the said outer convoluting layer of heavier gases, including the smaller size carbon, or sulfur and lead particles, in to the said plurality of in-line compressed air filter assemblies.

7. An apparatus as set forth in claim 4, said second separating device comprising:

a plurality of elongated, horizontal slots machined at an angle of 30 degrees to the vertical axis, on the smaller end of said vortex tube;

means provided for a gas collector chamber comprising a cylindrical shell centrally mounted over the said slots;

and said gas chamber provided with a converging gas exit tube mounted peripherally and tangentially to the cylindrical shell of the gas collector chamber and located centrally over the said slots, in order to tangentially tilt the out flow of the said convoluting heavier gases, including the lighter weight carbon, lead or sulfur particles, towards the gas collector chamber's exit tube;

whereby further streamlining and enhancing the said heavier gas and particles flow in to the said plurality of in-line compressed air filter assemblies.

8. The apparatus as set forth in claim 4, said separating device comprising:

a plurality of elongated, horizontal slots machined at an angle of 30 degrees to the vertical axis, on the smaller end of the said vortex tube;

means provided for a gas collector chamber comprising a cylindrical shell, centrally mounted over said slots;

said gas collector chamber provided with a converging gas exit tube mounted peripherally and tangentially to the cylindrical shell of the gas collector chamber and located centrally over said slots;

means provided for the interior surfaces of the gas collector chamber and exit tube to be completely coated with a friction reducing, high temperature, abrasion resistant thermo-setting and organic industrial coating;

thereby further improving the streamlined and smooth out flow of the said outer layer of heavier gases, including the lighter weight carbon, sulfur and lead particles, to the said plurality of in-line compressed air filter assemblies.

9. An apparatus as set forth in claim 4, including an internal combustion engine operating with unleaded or leaded gasoline or diesel or natural gas fuel, in combination therewith and having a cooling radiator and comprising;

a bearing support means for said turbine;

means for conducting cooling fluid from said radiator to said bearing support means;

means for the return of cooling fluid to said radiator, after the cooling of said bearing support means;

whereby reducing the bearing working temperature and achieving higher turbine speeds resulting in the improved separation of said lighter and heavier pollutant gases for recycling in to the said internal combustible engine.

10. An apparatus as set forth in claim 4, including:

means for mixing the lighter combustible gases from the said water scrubber and heavier combustible gases from the said plurality of air filter assemblies with fresh fuel vapor for feed to said engine;

said means comprising a three-way connection to link the said two gas streams to the underside of the said engine's air intake pipe or air filter body;

whereby, allowing for the proper admixture of the lighter and heavier pollutant and combustible gases, including the 15~25 micron size carbon particles prior to their re-cycling into said internal combustion engine.

11. An apparatus for separation of exhaust gas components of an internal combustion engine operating with leaded or unleaded gasoline, diesel or natural gas fuel, to reduce atmospheric pollution and improve the engine's fuel economy, comprising:

a first exhaust gas separating stage and means for bringing exhaust gas thereto from an engine whereby exhaust gas is separated into its lighter and primarily combustible components, substantially separated from its heavier and primarily non-combustible components;

a second separating stage and means for conducting said heavier components thereto from said first separating stage;

a water scrubber containing sodium hydroxide solution and means whereby said lighter components are fed thereto from said first separating stage, for dissolving of nitric oxide, formaldehyde impurities thereby purifying the said lighter component's combustible gases;

said second separating stage having means communicating with the atmosphere and having means to substantially separate combustible gases of said heavier components from non-combustible gases;

means to feed said heavier component's combustible gases of second separating stage to a plurality of in-line compressed air filter assemblies for discarding in progressive stages, the gas impurities including aldehyde or sulfur or sulfate or nitrogen oxide and lead particles, but allowing the small 15~25 micron size carbon particles to flow out with the said heavier component's combustible gases;

means to feed said lighter and heavier combustible gases including the 15~25 micron carbon particles to the said engine while said non-combustible gases and water vapor of the said second separating stage egress to the atmosphere.

12. An apparatus as set forth in claim 11, wherein said gas separating stages comprises:

an upstream stator, followed by an exhaust gas driven turbine and a conical vortex tube open at both ends and connected thereto at its larger end via a down stream stator, so as to receive the rotating gas discharge therefrom for initial separation by axial movement in opposite directions therein of an inner gas core of said primarily combustible lighter gases and an outer layer of said heavier gases for the subsequent separation into said primarily combustible and non-combustible gases.

13. An apparatus as set forth in claim 11, comprises:

said water scrubber having a charge of sodium hydroxide solution therein;

means for bubbling the return combustible gases thereto through said sodium hydroxide solution to dissolve the said nitric oxide and aldehyde components, in order to preclude these combustion inhibiting components from entering said engine;

means for providing a catalyst in said water scrubber to augment the reaction of said combustion inhibiting gases with said sodium hydroxide solution;

whereby improving the dissolution of nitric oxide and aldehyde gases.

14. An apparatus as set forth in claim 11, wherein said gas separating stages comprises:

an upstream stator, followed by an exhaust gas driven turbine and a conical vortex tube connected thereto at its larger end via a down stream stator, so as to receive rotating gas discharge therefrom for separation into an inner gas core of said primarily combustible lighter gases and an outer layer of said heavier gases for subsequent separation into said primarily combustible and non-combustible gases;

said means provided for conducting said lighter gases of said inner core from said vortex tube to said water scrubber comprising a hollow shaft for said turbine communicating with said vortex tube at the inner core region;

means provided for mounting said turbine comprising a bearing device encompassing said hollow shaft;

support means provided for said bearing device comprising a housing having a hollow hub in which said bearing device is carried;

said housing having an annular cooling chamber surrounding said hub for cooling said bearing device;

and means provided for conducting a cooling medium through said cooling chamber;

whereby lowering the working temperature of the turbine-support bearings and achieving higher turbine rotating speed, which results in higher combustible gas and particles separation efficiency.

15. An apparatus for separation of a mixture of exhaust gases of an internal combustion engine operating with unleaded or leaded gasoline, diesel, or natural gas fuel for burning combustible portions thereof to reduce atmospheric pollution and increase the fuel economy of the engine, comprising:

a rotational device and means for feeding an exhaust gas mixture thereto to be rotated thereby to effect a rotational directional speed of gas mixture passing therethrough greater than the speed of exhaust gas mixture fed to said device;

a vortex tube connected to said rotational device for receiving rotating exhaust gases therefrom to be stratified therein into a heavier outer layer of mixed combustible and non-combustible gases and a lighter inner core of primarily combustible gases;

means for feeding said inner core gases to said internal combustion engine to be burned therein including a water scrubber chamber wherein the inner core combustible gases are purified;

means for separating said heavier outer layer into substantially heavier combustible gases, including carbon, lead, or sulfur particles, and substantially non-combustible gases comprising a horizontal, elongated slotted area of vortex tube, through which area said heavier combustible gases, including carbon, lead, or sulfur particles, leave said vortex tube;

means provided for removal of the heavier carbon, lead, or sulfur particles collecting in a gas collector chamber surrounding the slotted area of vortex tube;

means for feeding said heavier combustible gases to said internal combustion engine to be burned therein including a plurality f in-line compressed air filter assemblies, wherein the combustible gases from said outer layer of gases are purified; and means for exhausting said latter non-combustible gases from said vortex tube to the atmosphere.

16. The apparatus as set forth in claim 15, wherein the means for feeding said inner core combustible gases comprises:

a water scrubber chamber wherein the inner core combustible gases are purified and said means provided for feeding the inner core combustible gases to said internal combustion engine;

means provided for feeding said combustible gases from said outer layer of gases comprises a plurality of in-line compressed air filter assemblies, wherein the combustible gases from the said outer layer of gases are purified;

and means provided for feeding the said outer layer combustible gases to said internal combustion engine.

17. An apparatus as set forth in claim 16, wherein said vortex tube is tapered to increase the rotational speed of the gases therein; the larger end thereof being connected to said rotational device and the smaller end being open for exhausting said non-combustible gases;

said horizontal, elongated slotted area being adjacent to said smaller open end of vortex tube, benefits from the significantly increased exhaust gases' convoluting speed as they approach the second separation stage at the said slotted area in the smaller end of the vortex tube;

thereby improving the separation amount of the heavier combustible gases from the non-combustible gases.

18. An apparatus as set forth in claim 16, including an internal combustion engine in combination with said apparatus and said rotational device being a turbine connected thereto for tangential exhaust gas feed thereto and axial flow therefrom to said vortex tube and said rotational device connected thereto to be driven by the exhaust gas mixture thereof.

19. An apparatus as set forth in claim 17, including said water scrubber chamber;

means for passing said combustible gases through said sodium hydroxide in water solution charge therein, to preclude the passing of said aldehydes and said nitrogen oxides from said water scrubber;

means for passing said combustible gases through said sodium bisulfite in water solution charge therein, to preclude the passing of said aldehydes from said water scrubber;

means for passing said combustible gases through said potassium dichromate in water solution charge therein, to preclude the passing of said aldehydes from said water scrubber.

20. An apparatus as set forth in claim 11, comprises said water scrubber having a sodium hydroxide solution charge therein and means for bubbling the return combustible gas thereto through said charges to remove the aldehyde and nitrogen oxide components, in order to preclude these combustion inhibiting components from entering said engine, including a catalyst in said water scrubber chamber to augment reaction of said combustion inhibiting gases with said sodium hydroxide solution;

said catalyst comprising a perforate plate of material having catalytic properties disposed in said water scrubber chamber in said sodium hydroxide solution charge and through which said return combustible gases pass.

* * * * *